US009608279B2

United States Patent
Hirose (10) Patent No.: US 9,608,279 B2
(45) Date of Patent: Mar. 28, 2017

(54) METAL-AIR BATTERY (75) Inventor: Yutaka Hirose, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 327 days.

(21) Appl. No.: 14/363,532

(22) PCT Filed: Dec. 9, 2011

(86) PCT No.: PCT/JP2011/078583
§ 371 (c)(1),
(2), (4) Date: Jun. 6, 2014

(87) PCT Pub. No.: WO2013/084355
PCT Pub. Date: Jun. 13, 2013

(65) Prior Publication Data
US 2014/0315107 A1    Oct. 23, 2014

(51) Int. Cl.
*H01M 12/08* (2006.01)
*H01M 4/96* (2006.01)
*H01M 12/06* (2006.01)

(52) U.S. Cl.
CPC ............. *H01M 4/96* (2013.01); *H01M 12/06* (2013.01); *H01M 12/08* (2013.01); *H01M 2300/0028* (2013.01); *H01M 2300/0045* (2013.01); *Y02E 60/50* (2013.01)

(58) Field of Classification Search
CPC .................................................... H01M 12/08
USPC ................................................................ 429/405
See application file for complete search history.

(56) References Cited

U.S. PATENT DOCUMENTS

| 2002/0049134 A1 | 4/2002 | Imazato |
| 2011/0091777 A1 | 4/2011 | Mizuno et al. |
| 2011/0200892 A1* | 8/2011 | Nakanishi ............... H01M 4/88 429/403 |
| 2012/0237838 A1 | 9/2012 | Uesaka |

FOREIGN PATENT DOCUMENTS

| JP | A-2002-015737 | 1/2002 |
| JP | A-2010-257839 | 11/2010 |
| JP | A-2011-096492 | 5/2011 |
| JP | A-2011-096586 | 5/2011 |
| JP | A-2011-146157 | 7/2011 |
| JP | A-2011-238404 | 11/2011 |
| WO | WO 02/27828 A1 | 4/2002 |
| WO | WO 2010-073332 A1 | 7/2010 |

OTHER PUBLICATIONS

"Development of New-type Lithium-Air Battery with Large Capacity," *National Institute of Advanced Industrial Science and Technology Online Press Release*, Feb. 24, 2009, pp. 1-3 (with translation).

* cited by examiner

*Primary Examiner* — Basia Ridley
*Assistant Examiner* — James Erwin
(74) *Attorney, Agent, or Firm* — Oliff PLC (57) ABSTRACT

Provided is a metal-air battery which has higher discharge capacity than conventional metal-air batteries. The present invention is a metal-air battery, which comprises a positive electrode layer, a negative electrode layer and an electrolyte layer that is arranged between the positive electrode layer and the negative electrode layer, and wherein the positive electrode layer contains a carbon material and is provided with two or more through holes that penetrate the positive electrode layer in the thickness direction.

17 Claims, 4 Drawing Sheets

METAL-AIR BATTERY

TECHNICAL FIELD

The present invention relates to a metal-air battery that utilizes oxygen as a positive electrode active material.

BACKGROUND ART

With the popularity and continuing development of devices such as cellular phones in recent years, higher capacities are being desired for batteries that are used as their power sources. Of particular note are metal-air batteries, as high-capacity batteries that are superior to the currently widely used lithium ion batteries, since an oxidation-reduction reaction of oxygen is performed at an air electrode by utilizing the oxygen in the air as an active material for the air electrode, and an oxidation-reduction reaction of a metal constituting a negative electrode is performed at the negative electrode, so that charging and discharging are possible respectively allowing high energy density (NPL 1).

For higher capacity in a metal-air battery, there has been proposed an air battery comprising a positive electrode that is a positive electrode layer molded into a sheet as the positive electrode of the metal-air battery, and composed mainly of a carbonaceous substance with pores of 1 nm and larger (PTL 1).

CITATION LIST

Patent Literature

[PTL 1] Japanese Unexamined Patent Publication No. 2002-15737

Non-Patent Literature

[NPL 1] National Institute of Advanced Industrial Science and Technology (AIST), "Development of high performance lithium-air battery with novel structure" [online], Feb. 24, 2009 release [Aug. 19, 2011 search] Internet: <http://www.aist.go.jp/aist_j/press_release/pr2009/pr20090224/pr20090224.html>

SUMMARY OF INVENTION

Problems to be Solved by the Invention

Thus, with an aim toward increasing capacity for metal-air batteries, there have been proposed in the prior art air batteries that comprise a positive electrode that is a positive electrode layer molded into a sheet and composed mainly of a carbonaceous substance having pores of 1 nm and larger, but even higher capacities are still desired.

Means for Solving the Problems

The metal-air battery of the invention has a construction with through-holes in the thickness direction of a positive electrode layer comprising a carbon material.

The present invention is a metal-air battery comprising a positive electrode layer, a negative electrode layer and an electrolyte layer containing an electrolyte solution between the positive electrode layer and negative electrode layer, wherein the positive electrode layer comprises a carbon material and has two or more through-holes running through the thickness direction of the positive electrode layer.

Effect of the Invention

According to the invention it is possible to obtain a metal-air battery with discharge capacity higher than conventional metal-air batteries.

EMBODIMENTS FOR CARRYING OUT THE INVENTION

The metal-air battery of the invention comprises a positive electrode layer, a negative electrode layer and an electrolyte layer containing an electrolyte solution between the positive electrode layer and negative electrode layer, wherein the positive electrode layer comprises a carbon material and has a construction with two or more through-holes running through the thickness direction of the positive electrode layer.

During discharge in a metal-air battery, oxidation-reduction reaction takes place in a positive electrode in which oxygen in the air is reduced and metal ions of a negative electrode are oxidized. It has been thought that in a metal-air battery, the oxidation-reduction reaction of oxygen and the negative electrode metal ions occur within the nanoscale pores of the high-surface-area carbon material of the positive electrode, and therefore positive electrode materials composed mainly of high-surface-area carbon materials are used in metal-air batteries.

However the present inventors have found, surprisingly, that by forming through-holes in the thickness direction of the positive electrode layer it is possible to substantially increase the discharge capacity of a metal-air battery compared to the prior art. The through-holes may have diameters on the microscale, which is a significantly different size than conventional nanoscale pores.

While it is not our intention to be limited by theory, it is believed that that formation of through-holes in the thickness direction of the positive electrode layer can promote diffusion of the oxygen and the metal ions in the thickness direction of the positive electrode layer, thereby promoting oxidation-reduction reaction of the oxygen and the metal ions and allowing the discharge capacity of the battery to be improved. It is also believed that formation of multiple through-holes in the positive electrode layer can promote diffusion of the oxygen and the metal ions in the transverse direction of the positive electrode layer (the direction perpendicular to the thickness direction), which also promotes oxidation-reduction reaction of the oxygen and the negative electrode metal ions and is associated with capacity improvement in batteries. Thus, presumably through-holes in the positive electrode layer can improve diffusion of the oxygen and the metal ions at the positive electrode, thereby promoting oxidation-reduction reaction of the oxygen and the negative electrode metal ions and increasing the discharge capacity of the battery.

According to the invention, "through-holes" are two or more holes formed running through the thickness direction of the positive electrode layer. Through-holes are holes running across the thickness of the positive electrode layer, formed so as to connect the top and bottom sides of the positive electrode layer.

The through-holes are preferably formed parallel to the thickness direction of the positive electrode layer (perpendicular to the top and bottom sides of the positive electrode layer), but they may be formed at an oblique angle with respect to the thickness direction of the positive electrode layer. The through-holes are preferably cylindrical having the same diameter across the thickness of the positive electrode layer, but they may have different shapes across the thickness of the positive electrode layer. For example, the through-holes may be cylindrical having the same diameter across the thickness of the positive electrode layer, or having different diameters across the thickness of the positive electrode layer, such as truncated circular conic shapes with tapering angles. The shapes of the through-holes are not limited to be cylindrical and may be any other shape such as rectangular columnar or elliptic cylindrical.

In the metal-air battery according to the invention, all of the through-holes formed in the positive electrode layer preferably run through in a manner connecting the top and bottom sides of the positive electrode layer, but this does not exclude cases where a portion of the through-holes do not run through. The proportion of through-holes among the total number of holes is preferably 50% or greater, more preferably 60% or greater, even more preferably 70% or greater, yet more preferably 80% or greater, even yet more preferably 90% or greater and most preferably 100%.

In the metal-air battery according to the invention, the diameters of the through-holes in the positive electrode layer are preferably on the micro order. In order for the through-hole interiors to be filled with the electrolyte solution, the through-hole diameters are preferably 1 µm or greater, more preferably 10 µm or greater, even more preferably 20 µm or greater, yet more preferably 30 µm or greater, even yet more preferably 50 µm or greater and especially preferably 65 µm or greater. The diameters of the through-holes in the positive electrode layer are preferably 1000 µm or smaller, more preferably 500 µm or smaller, even more preferably 300 µm or smaller, yet more preferably 220 µm or smaller and especially preferably 170 µm or smaller.

In the metal-air battery according to the invention, the total inner wall area of the through-holes formed in the positive electrode layer is preferably 50 $m^2/m^3$ or greater and even more preferably 80 $m^2/m^3$ or greater per unit volume of the positive electrode layer.

The inner wall area of the through-holes is the area on the inner walls of the through-holes calculated from the diameters of the through-holes and the thickness of the positive electrode layer. The inner wall area of the through-holes per unit volume of the positive electrode layer is the numerical value of the inner wall area of the through-holes divided by the volume of the positive electrode layer. Thus, a greater number of holes formed in the positive electrode layer will increase the numerical value of the inner wall area of the through-holes per unit volume of the positive electrode layer. With a lower number of holes, increasing diameters of the through-holes will increase the numerical value of the inner wall area of the through-holes per unit volume of the positive electrode layer. Thus, while it is generally preferred to have a larger inner wall area of the through-holes per unit volume of the positive electrode layer, it is preferably 25000 $m^2/m^3$ or less, more preferably 10000 $m^2/m^3$ or less and even more preferably 5000 $m^2/m^3$ or less from the viewpoint of guaranteeing reaction sites for the oxygen and the metal ions in the positive electrode layer and for strength of the positive electrode layer. The thickness of the positive electrode layer is the apparent thickness calculated from the total mean thickness of the positive electrode layer, and it is the thickness calculated without considering the through-holes of the positive electrode layer. The volume of the positive electrode layer is the volume calculated from the apparent diameter of the positive electrode layer and the apparent thickness of the positive electrode layer, and it is the apparent volume calculated without considering irregularities on the surface or through-holes of the positive electrode layer.

When X (number) through-holes with a mean diameter of Y (m) are formed in a positive electrode layer having an area of Z ($m^2$) and a thickness of W (m), the inner wall area of the through-holes per unit volume of the positive electrode layer is calculated by the following formula:

Inner wall area of through-holes per unit volume of positive electrode layer=$(\pi Y \times W \times X)/(W \times Z)$($m^2/m^3$).

In the metal-air battery according to the invention, the inverse of the spacing of through-holes formed in the positive electrode layer is preferably 220 (1/m) or greater and more preferably 510 (1/m) or greater.

As used herein, the "inverse of the spacing of through-holes" is the inverse of the average distance between the diameters of through-holes formed in the positive electrode layer. Consequently, a larger numerical value for the inverse of the spacing between through-holes corresponds to a smaller spacing between the through-holes. A larger number of holes and/or larger diameters formed in the positive electrode layer will result in a larger numerical value for the inverse of the spacing between through-holes. While a larger numerical value for the inverse of the spacing between through-holes is generally preferred, it is preferably 36000 (1/m) or less, more preferably 10000 (1/m) or less and even more preferably 5000 (1/m) or less from the viewpoint of guaranteeing reaction sites for the oxygen and the metal ions in the positive electrode layer and for strength of the positive electrode layer.

The inverse of the spacing between through-holes can be calculated by the following procedure. When X (number) through-holes with mean diameters of Y (m) are formed in the thickness direction of a positive electrode layer having an area of Z ($m^2$), assuming that the through-holes are aligned in a square manner at equal spacings on a square positive electrode surface, the mean distance between diameters of multiple through-holes can be calculated by the following formula:

$$\text{Mean distance between through-hole diameters} = \frac{\sqrt{Z} - \sqrt{X} \times Y}{\sqrt{X} - 1} (m) \quad \text{[Formula 1]}$$

and the inverse of the spacing between through-holes can be calculated by the following formula:

$$\text{Inverse of spacing between through-holes} = \frac{\sqrt{X} - 1}{\sqrt{Z} - \sqrt{X} \times Y} (m) \quad \text{[Formula 2]}$$

The number of through-holes in the positive electrode layer of the metal-air battery according to the invention is 2 or greater, preferably 10 or greater, more preferably 50 or greater, even more preferably 100 or greater and yet more preferably 200 or greater. A larger number of through-holes is generally preferred to increase the inner wall area of through-holes per unit volume of the positive electrode layer or the value of the inverse of the spacing between through-holes, but it may be selected as the number of holes that satisfies the preferred range for the value of the inner wall area of the through-holes per unit volume of the positive electrode layer or for the value of the inverse of the spacing between through-holes.

Formation of the through-holes in the positive electrode layer may be performed by any desired method that allows stable formation of through-holes having the desired diameters in the positive electrode layer, and it may be accomplished by a punching method wherein a pin made of metal or the like is used for piercing, by a molding method wherein the positive electrode layer is molded in a die and then the die is removed, or by a laser processing method using a carbon dioxide gas laser, YAG laser or the like.

The diameters of the through-holes are the values measured as scanning electron microscope (SEM) diameters, observed from the surface of the positive electrode layer using SEM, and are the average value of values obtained by measuring the diameters of about 10 to several 100 through-holes among the formed through-holes. When the diameters of the through-holes differ from front to back of the positive electrode layer, such as when the through-holes have tapered angles and thus have different diameters across the thickness of the positive electrode layer, the average value of the diameters of through-holes on the front and back of the positive electrode layer is used as the diameter of the through-hole. The diameters of the through-holes may also be measured by observation from a cross-section of the positive electrode layer.

The inner wall area of the through-holes is the value of the circumference calculated from the diameter of through-hole measured as described above, multiplied by the thickness of the positive electrode layer and the number of through-holes.

The positive electrode layer may contain a conductive material. The conductive material is preferably a porous material, although this is not limitative. A carbon material, such as carbon, may be used as the porous material. Examples of the carbon include carbon black, such as Ketchen black, acetylene black, channel black, furnace black or mesoporous carbon, active carbon, carbon fiber or the like, and carbon materials having a high specific surface area are preferable as the porous material. The porous material is preferably one having a pore volume on the nanometer order, such as about 1 mL/g. Preferably, the conductive material occupies 10 to 99 wt % of the positive electrode layer.

The positive electrode layer may contain a binder. Examples of the binder include fluorine-based resins, such as polytetrafluoroethylene (PTFE), polyvinylidene fluoride (PVdF) and fluorine rubber, thermoplastic resins, such as polypropylene, polyethylene and polyacrylonitrile, and styrene-butadiene rubber (SBR). Preferably, the binder occupies 1 to 40 wt % of the positive electrode layer.

The positive electrode layer may contain an oxidation-reduction catalyst. Examples of the oxidation-reduction catalyst include metal oxides, such as manganese dioxide, cobalt oxide and cerium oxide, precious metals, such as Pt, Pd, Au and Ag, transition metals, such as Co, metal phthalocyanines, such as cobalt phthalocyanine, and organic materials, such as Fe-porphyrin. Preferably, the oxidation-reduction catalyst occupies 1 to 90 wt % of the positive electrode layer.

In the air battery according to the invention, the electrolyte layer conducts transmission of metal ions between the positive electrode layer and the negative electrode layer. Examples of the electrolyte layer include a liquid electrolyte, a gel electrolyte, a polymer electrolyte or a combination thereof. The electrolyte may infiltrate into the microscale through-holes and nanoscale pores in the positive electrode layer.

As the liquid electrolyte there may be used a liquid that can exchange metal ions between the positive electrode layer and negative electrode layer, and it may be an aprotic organic solvent, an ionic liquid or the like.

Examples of the organic solvent include propylene carbonate, ethylene carbonate, diethyl carbonate, dimethyl carbonate, ethylmethyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane, γ-butyrolactone, glymes and the like. Ionic liquids are preferably ones with high oxygen radical resistance that can minimize side reactions. Examples of the Ionic liquid include N-methyl-N-propylpiperidinium bis(trifluoromethanesulfonyl)amide (PP13TFSA). The electrolyte solution may be a combination of the aforementioned ionic liquid and organic solvent.

A supporting electrolyte may be dissolved in the electrolyte solution. As supporting electrolytes there may be used salts comprising lithium ion and any of the following anions:

halide anions, such as $Cl^-$, $Br^-$ and $I^-$; boride anions, such as $BF_4^-$, $B(CN)_4^-$ and $B(C_2O_4)_2^-$; amide anions or imide anions, such as $(CN)_2N^-$, $[N(CF_3)_2]^-$ and $[N(SO_2CF_3)_2]^-$; sulfate anions or sulfonate anions, such as $RSO_3^-$ (hereunder, R denotes an aliphatic hydrocarbon or aromatic hydrocarbon group), $RSO_4^-$, $R^fSO_3^-$ (hereunder, $R^f$ denotes a fluorine-containing halogenated hydrocarbon group) and $R^fSO_4^-$; phosphate anions, such as $R^f_2P(O)O^-$, $PF_6^-$ and $R^f_3PF_3^-$; antimony anions, such as $SbF_6^-$; or anions, such as lactate, nitrate ion and trifluoroacetate, and examples of the supporting electrolyte include $LiPF_6$, $LiBF_4$, lithium bis(trifluoromethanesulfonyl)amide (LiN $(CF_3SO_2)_2$, hereunder "LiTFSA"), $LiCF_3SO_3$, $LiC_4F_9SO_3$, $LiC(CF_3SO_2)_3$ and $LiClO_4$, and LiTFSA is preferably used. Such supporting electrolytes may be used in combinations of two or more. There is no particular restriction on the amount of supporting electrolyte added to the electrolyte solution, but it is preferably about 0.1 to 1 mol/kg.

The electrolyte may be a polymer electrolyte, gel electrolyte or the like.

The polymer electrolyte to be used as an electrolyte may be used together with an ionic liquid, for example, and preferably it includes a lithium salt and a polymer. The lithium salt is not particularly restricted so long as it is a lithium salt that is generally used in the prior art in lithium-air batteries and the like, and examples thereof include lithium salts used as the aforementioned supporting electrolytes. The polymer is not particularly restricted so long as it forms a complex with the lithium salt, and examples thereof include polyethylene oxide.

The gel electrolyte to be used as an electrolyte may be used together with an ionic liquid, for example, and preferably it includes a lithium salt, a polymer and a non-aqueous solvent. The lithium salt used may be any of the lithium salts mentioned above. The non-aqueous solvent is not particularly restricted so long as it can dissolve the lithium salt, and the aforementioned organic solvents may be used, for example. These non-aqueous solvents may be used alone, or two or more may be used in admixture. The polymer is not particularly restricted so long as it is capable of gelling, and examples thereof include polyethylene oxide, polypropylene oxide, polyacrylonitrile, polyvinylidene fluoride (PVDF), polyurethane, polyacrylate, cellulose and the like.

In the metal-air battery according to the invention, a separator may be provided between the positive electrode layer and the negative electrode layer. There are no particular restrictions on the separator, and for example, there may be used a polymer nonwoven fabric, such as a polypropylene nonwoven fabric or polyphenylene sulfide nonwoven fabric, a fine porous film of an olefin-based resin, such as polyethylene or polypropylene, or a combination thereof. The electrolyte, such as a liquid electrolyte solution, may be impregnated into a separator to form an electrolyte layer.

The negative electrode layer in the metal-air battery of the invention is a layer containing a negative electrode active material. For example, the negative electrode active material may be a metal, alloy material or carbon material, and examples thereof include alkali metals, such as lithium, sodium and potassium, alkaline earth metals, such as magnesium and calcium, Group 13 elements, such as aluminum, transition metals, such as zinc, iron and silver, alloy materials containing these metals, carbon materials, such as graphite, or anode materials that can be used for lithium ion batteries.

As the negative electrode active material there may be used an alloy, oxide, nitride or sulfide containing the element lithium. Examples of the alloy containing the element lithium include lithium aluminum alloy, lithium tin alloy, lithium lead alloy and lithium silicon alloy. Examples of the metal oxide containing the element lithium include lithium titanium oxide. Examples of the metal nitride containing the element lithium include lithium cobalt nitride, lithium iron nitride and lithium manganese nitride.

The negative electrode layer may further contain a conductive material and/or binder. For example, when the negative electrode active material is in the form of a foil, the negative electrode layer may contain the negative electrode active material alone, or when the negative electrode active material is in powdered form, the negative electrode layer may have the negative electrode active material and a binder. For the conductive material and binder, they may be the same materials as in the positive electrode layer.

Covering materials that may be used in the metal-air battery of the invention may be materials that are commonly used as covering materials for air batteries, such as metal cans, resins and laminate packs.

The covering material may be provided with holes at desired locations for supply of oxygen, and for example, it may be provided with holes facing the contact surface of the positive electrode layer with the air.

The metal-air battery of the invention may comprise an oxygen permeation film. The oxygen permeation film may be positioned, for example, on the positive electrode layer, on the side in contact with the air, on the side opposite to the electrolyte layer side. The oxygen permeation film may be a water-repellent porous film or the like that allows oxygen in the air to pass through while preventing approach of moisture, and for example, a porous film made of polyester or polyphenylene sulfide may be used. A water-repellent film may be separately provided.

A positive electrode collector may be positioned adjacent to the positive electrode layer. The positive electrode collector may usually be positioned on the positive electrode layer, on the side in contact with air and on the side opposite to the electrolyte layer, but it may be positioned between the positive electrode layer and the electrolyte layer. The positive electrode collector is not particularly restricted so long as it is a material used in the prior art as a collector, and for example, a porous structure, such as carbon paper or metal mesh, or a mesh-like structure, fibers, nonwoven fabric or the like, and metal meshes formed from SUS, nickel, aluminum, iron, titanium or the like may be used. A metal foil with oxygen supply holes may be used as the positive electrode collector.

A negative electrode collector may be positioned adjacent to the negative electrode layer. The negative electrode collector is not particularly restricted so long as it is a material used in the prior art as a negative electrode collector, such as a conductive substrate with a porous structure or a non-porous metal foil, and for example, metal foils formed from copper, SUS, nickel or the like may be used.

The form of the metal-air battery of the invention is not particularly restricted so long as it is a form with oxygen intake holes, and it may have any desired form such as a cylindrical, rectilinear, button-shaped, coin-shaped or flat form.

The metal-air battery of the invention can be used as a secondary battery, but it may also be used as a primary battery.

Formation of the positive electrode layer, electrolyte layer and negative electrode layer in the metal-air battery of the invention can be performed by using any desired method carried out in the prior art. For example, for formation of a positive electrode layer containing carbon particles and a binder, an appropriate amount of solvent, such as ethanol, may be added to a prescribed amount of carbon particles and a binder and mixed therewith, and then the obtained mixture may be rolled to a prescribed thickness with a roll press and dried and cut to form the positive electrode layer. Next, a metal pin or the like may be used to form desired through-holes in the formed positive electrode layer, and a positive electrode collector may be contact-bonded therewith and then heated and vacuum dried to obtain a positive electrode layer combined with the collector. Alternatively, an appropriate amount of a solvent may be added to a prescribed amount of carbon particles and a binder and mixed therewith to obtain a slurry, and the slurry may be coated onto a substrate and dried to obtain a positive electrode layer. The obtained positive electrode layer may optionally be subjected to press molding. Through-holes may be formed in the obtained positive electrode layer in the same manner as the method described above. The solvent used to obtain the slurry may be acetone, NMP or the like, having a boiling point of no higher than 200° C. The coating process for the positive electrode layer slurry onto the substrate may be doctor blading, gravure transfer, an ink-jet method or the like. The substrate used is not particularly restricted, and it may be the current collector to be used as a collector, or a film-like substrate with flexibility, a hard substrate, or the like, and for example, it may be a substrate, such as a SUS foil, polyethylene terephthalate (PET) film or TEFLON®.

EXAMPLES

Fabrication of Cell

Example 1

90 wt % of Ketchen black (ECP600JD by Lion Corp.), 10 wt % of a polytetrafluoroethylene (PTFE) binder (product of Daikin Industries, Ltd.) and an appropriate amount of ethanol as a solvent were mixed to obtain a mixture. The obtained mixture was rolled with a roll press and dried and cut to obtain a positive electrode layer with a diameter of 18 mmϕ and a thickness of 130 μm.

The positive electrode layer was then pierced with a SUS metal pin with a 50 μmϕ diameter, at approximately equal spacings across the entire surface, to form 100 through-holes in the direction approximately perpendicular to the surface of the positive electrode layer. The surface of the positive electrode layer was observed with a scanning electron microscope (SEM, VE-9800 by Keyence Corp.), and the diameters of 100 through-holes were measured. The mean diameter of the through-holes was 65 μm.

A SUS304 100 mesh (product of Nilaco Corp.) was used as a collector to be contact-bonded with the through-hole-formed positive electrode layer, and then subjected to hot vacuum drying to combine the collector with the positive electrode layer.

Using N-methyl-N-propylpiperidinium bis(trifluoromethanesulfonyl)amide (PP13TFSA, product of Kanto Kagaku Co., Ltd.) as the solvent, the lithium salt: lithium bis(trifluoromethanesulfonyl)amide (LiTFSA, product of Kishida Chemical Co., Ltd.) was mixed and dissolved to a concentration of 0.32 mol/kg at 25° C. for 12 hours under an Ar atmosphere to prepare an electrolyte solution.

As the negative electrode layer there was prepared a metal lithium foil (product of Honjo Metal Co., Ltd.) with a diameter of 22 mmϕ and a thickness of 500 μm, and this was attached to a SUS304 (product of Nilaco Corp.) negative electrode collector with a diameter of 22 mm and a thickness of 2 cm.

Figure 3:
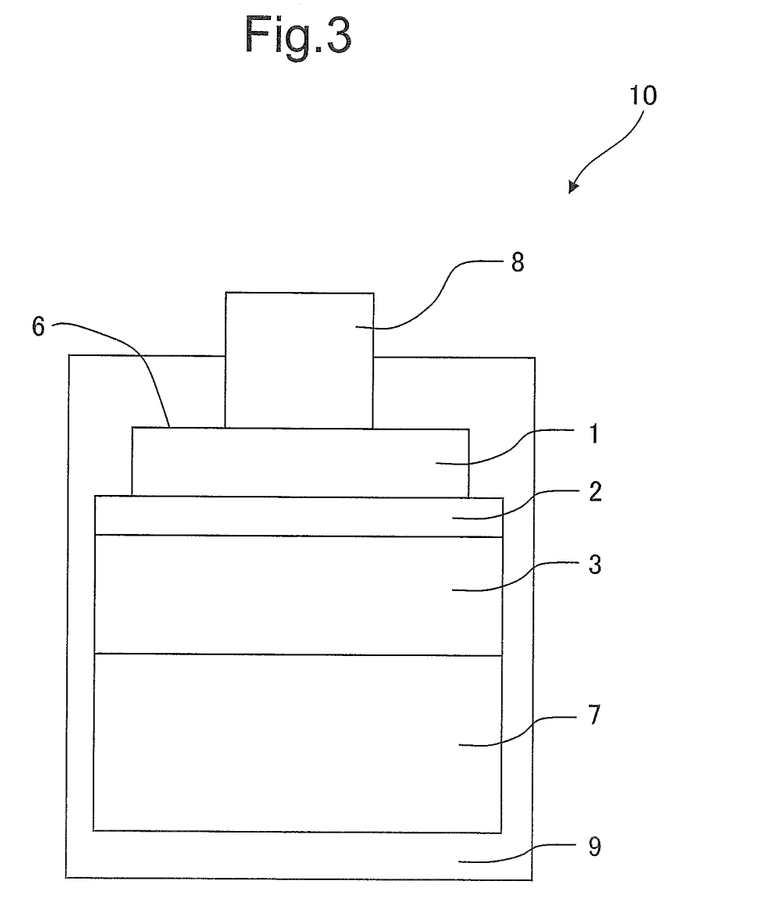
FIG. 3 is a cross-sectional schematic drawing of an electrochemical cell.

As a sealed container there was used a electrochemical cell 10 shown in FIG. 3. The negative electrode collector 7 and negative electrode layer 3 were assembled in the electrochemical cell 10 under an Ar atmosphere, a polypropylene nonwoven fabric with a thickness of 40 μm and a diameter of 28 mmϕ was positioned thereover as a separator, 100 μL of the prepared electrolyte solution was injected into the separator to form an electrolyte layer 2, and then the positive electrode (air electrode) layer 1 and positive electrode collector 6 were assembled, to fabricate an evaluation cell.

The electrochemical cell 10 was then placed in a glass desiccator (500 ml specification) equipped with a gas exchange cock, and the atmosphere in the glass desiccator was exchanged to an oxygen atmosphere using pure oxygen (99.9%, product of Taiyo Nippon Sanso Corp.).

Examples 2 to 4

In Examples 2 to 4 there were fabricated cells under the same conditions as Example 1, except that the surface of a positive electrode layer with a diameter of 18 mmϕ and a thickness of 130 μm was pierced with a SUS metal pin having a diameter of 50 μmϕ to form 200, 300 and 400 through-holes, respectively, and each of these was then placed in a glass desiccator (500 ml specification) equipped with a gas exchange cock, and the atmosphere in the glass desiccator was exchanged with an oxygen atmosphere using pure oxygen (99.9%, product of Taiyo Nippon Sanso Corp.).

The surfaces of the positive electrode layers fabricated in Examples 2 to 4 were respectively observed with a SEM, and the through-hole diameters were measured for 100 of the formed through-holes. The mean diameters of the through-holes were 65 μm.

Examples 5 and 6

In Examples 5 and 6 there were fabricated cells under the same conditions as Example 1, except that the surface of a positive electrode layer with a diameter of 18 mmϕ and a thickness of 130 μm was pierced with a SUS metal pin having a diameter of 100 μmϕ to form 75 and 200 through-holes, respectively, and each of these was then placed in a glass desiccator (500 ml specification) equipped with a gas exchange cock, and the atmosphere in the glass desiccator was exchanged with an oxygen atmosphere using pure oxygen (99.9%, product of Taiyo Nippon Sanso Corp.).

Figure 1:
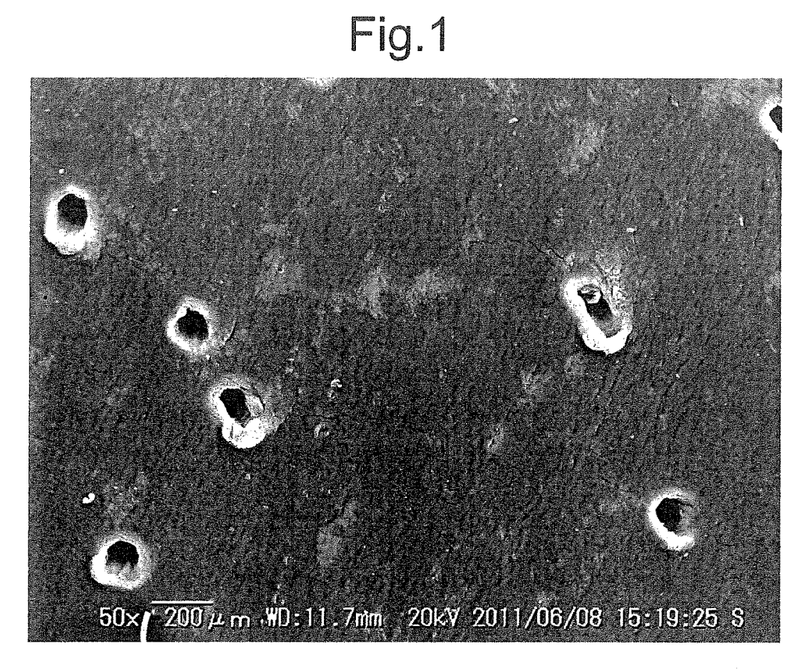
FIG. 1 is a scanning electron microscope (SEM) photograph of the surface of a positive electrode layer.
Figure 2:
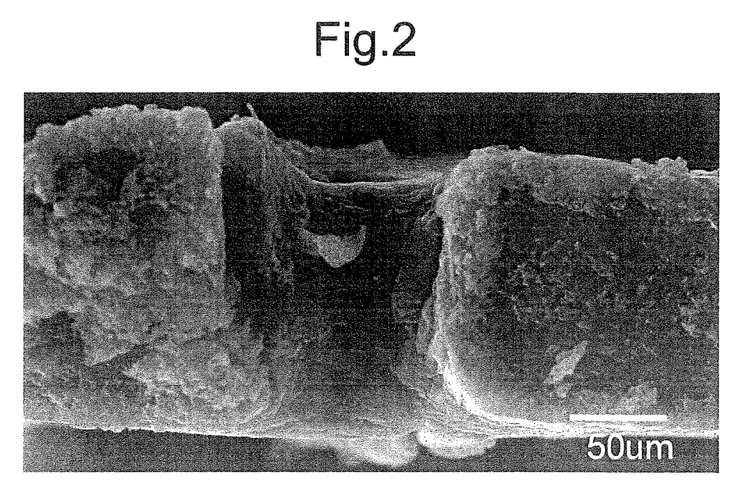
FIG. 2 is a SEM photograph of a cross-section of a positive electrode layer.

The surfaces of the positive electrode layers fabricated in Examples 5 and 6 were observed with a SEM, and the through-hole diameters were measured for 75 of the formed through-holes. FIG. 1 is a SEM photograph taken of the surface of a through-hole-formed positive electrode layer. FIG. 2 is a SEM photograph taken of the cross-section of a through-hole after cutting a positive electrode layer with a scalpel. The mean diameters of the through-holes were each 117 μm.

Example 7

In Example 7 there was fabricated a cell under the same conditions as Example 1, except that the surface of a positive electrode layer with a diameter of 18 mmϕ and a thickness of 130 μm was pierced with a SUS metal pin having a diameter of 150 μmϕ to form 200 through-holes, and it was then placed in a glass desiccator (500 ml specification) equipped with a gas exchange cock, and the atmosphere in the glass desiccator was exchanged with an oxygen atmosphere using pure oxygen (99.9%, product of Taiyo Nippon Sanso Corp.). The surface of the positive electrode layer was observed with a SEM and the diameters of 100 through-holes were measured. The mean diameter of the through-holes was 168 μm.

Example 8

In Example 8 a cell was fabricated under the same conditions as Example 1, except that the surface of a positive electrode layer with a diameter of 18 mmϕ and a thickness of 130 μm was pierced with a SUS metal pin having a diameter of 200 μmϕ to form 19 through-holes, and it was then placed in a glass desiccator (500 ml specification) equipped with a gas exchange cock, and the atmosphere in the glass desiccator was exchanged with an oxygen atmosphere using pure oxygen (99.9%, product of Taiyo Nippon Sanso Corp.). The surface of the positive electrode layer was observed with a SEM and the diameters of 19 through-holes were measured. The mean diameter of the through-holes was 220 μm.

Comparative Example 1

A cell was fabricated under the same conditions as Example 1, except for forming no through-holes, and it was then placed in a glass desiccator (500 ml specification) equipped with a gas exchange cock, and the atmosphere in the glass desiccator was exchanged to an oxygen atmosphere using pure oxygen (99.9%, product of Taiyo Nippon Sanso Corp.).

Reference Example 1

A cell was fabricated under the same conditions as Example 2, except that no through-holes were formed but 200 non-through-holes with diameters of 65 μm and depths of 65 μm were formed from the positive electrode collector side of a positive electrode layer with a thickness of 130 μm, on the side opposite to the electrolyte layer side, and this was then placed in a glass desiccator (500 ml specification) equipped with a gas exchange cock, and the atmosphere in the glass desiccator was exchanged to an oxygen atmosphere using pure oxygen (99.9%, product of Taiyo Nippon Sanso Corp.).

(Measurement of Cell Discharge Capacity)

The cells fabricated in Examples 1 to 8, Comparative Example 1 and Reference Example 1 were used to measure the discharge capacity under the following conditions:

Reaction mode: Constant current discharge reaction;
Discharge rate: 0.1 mA/cm² (normalized for 2.54 cm² as the apparent area of the positive electrode layer);
Cut voltage: 2.3 V;
Measuring temperature: 60° C.; and
Measuring atmosphere: $O_2$.

Under the above conditions, calculation was performed:
Discharge capacity (mAh/cm³)=(electrical charge)/(apparent volume of positive electrode layer).

The apparent area of the positive electrode is the area of the positive electrode layer calculated from a diameter of 18 mmϕ, and it is the area calculated without considering irregularities or through-holes on the surface of the positive electrode layer. The apparent volume of the positive electrode layer is the volume calculated from a positive electrode layer diameter of 18 mmϕ and a positive electrode layer thickness of 130 μm, and it is the volume calculated without considering irregularities on the surface or through-holes of the positive electrode layer.

Figure 4:
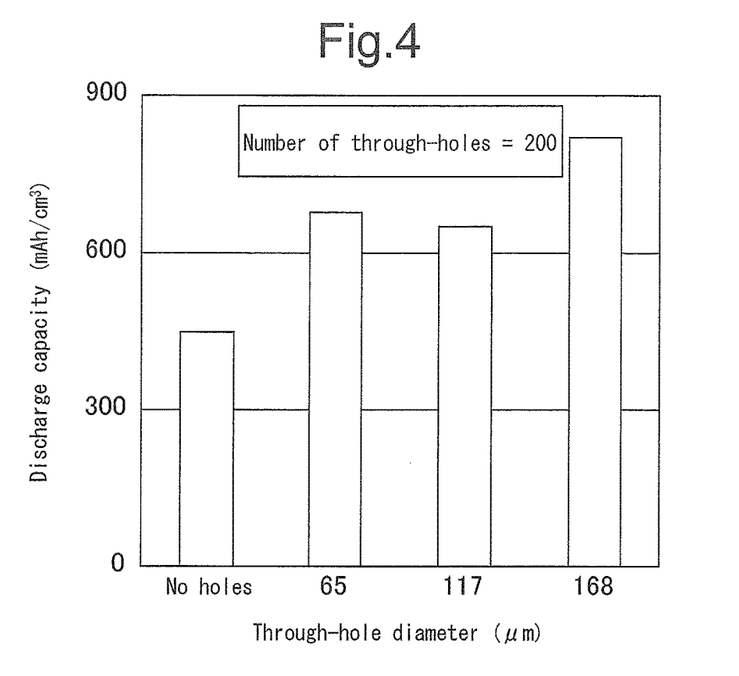
FIG. 4 is a graph showing values for the discharge capacity of a cell in relation to through-hole diameter.

Table 1 and FIG. 4 show the values for discharge capacities of the cells fabricated in Comparative Example 1 with no through-holes, and in Examples 2, 6 and 7 with 200 through-holes having diameters of 65 μm, 117 μm and 168 μm, respectively. The cells having through-holes formed in the positive electrode layers exhibited higher discharge capacity than the cell without through-holes.

TABLE 1

|  | Through-hole diameter (μm) | Discharge capacity (mAh/cm³) |
| --- | --- | --- |
| Comp. Ex. 1 | No hole | 449 |
| Example 2 | 65 | 676 |
| Example 6 | 117 | 651 |
| Example 7 | 168 | 819 |

Figure 5:
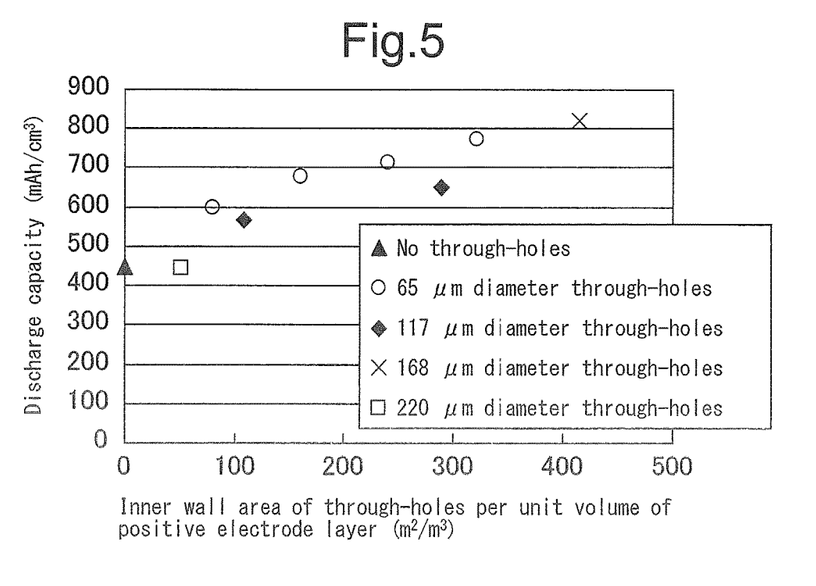
FIG. 5 is a graph showing values for the discharge capacity of a cell in relation to inner wall area of through-holes per unit volume of a positive electrode layer.

Table 2 and FIG. 5 show the values for the discharge capacities of cells with respect to inner wall area of through-holes per unit volume of the positive electrode layer, for the cells fabricated in Comparative Example 1 and Examples 1 to 8. The cells having through-holes formed in the positive electrode layers exhibited higher discharge capacity than the cell without through-holes. The higher the inner wall area of through-holes per unit volume of the positive electrode layer was, the higher the discharge capacity exhibited.

TABLE 2

|  | Through-hole diameter (μm) | Number of through-holes (holes) | Surface area of through-holes/volume of positive electrode layer (m²/m³) | Discharge capacity (mAh/cm³) |
| --- | --- | --- | --- | --- |
| Comp. Ex. 1 | No holes | No holes | No holes | 449 |
| Example 1 | 65 | 100 | 80 | 600 |
| Example 2 | 65 | 200 | 160 | 676 |
| Example 3 | 65 | 300 | 241 | 715 |
| Example 4 | 65 | 400 | 321 | 775 |
| Example 5 | 117 | 75 | 108 | 566 |
| Example 6 | 117 | 200 | 289 | 651 |
| Example 7 | 168 | 200 | 415 | 819 |
| Example 8 | 220 | 19 | 52 | 444 |

Figure 6:
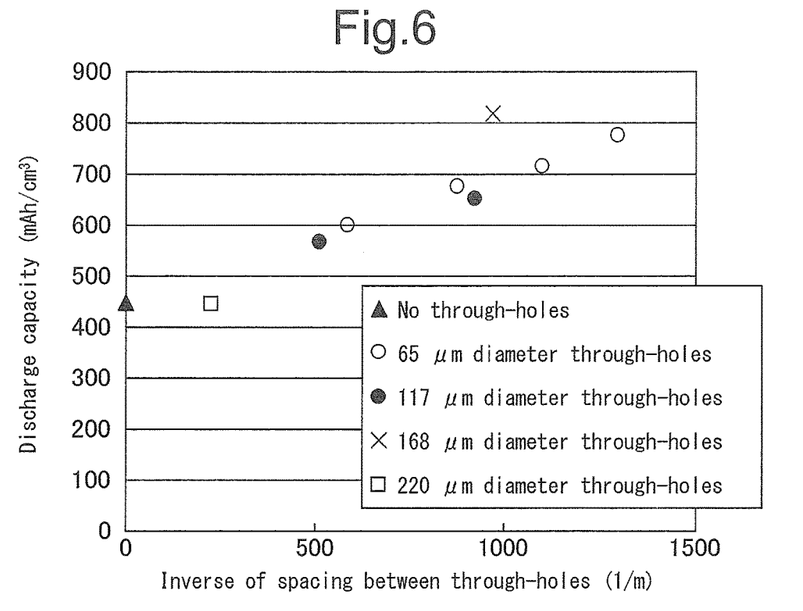
FIG. 6 is a graph showing values for the discharge capacity of a cell in relation to the inverse of through-hole spacing.

Table 3 and FIG. 6 show the values for the discharge capacities of cells with respect to inverse of the spacing between through-holes, for the cells fabricated in Comparative Example 1 and Examples 1 to 8. The cells having through-holes formed in the positive electrode layers exhibited higher discharge capacity than the cell without through-holes. The higher the inverse of the spacing between through-holes was, the higher the discharge capacity exhibited.

TABLE 3

|  | Through-hole diameter (μm) | Number of through-holes (holes) | Inverse of hole spacing (1/m) | Discharge capacity (mAh/cm³) |
| --- | --- | --- | --- | --- |
| Comp. Ex. 1 | No holes | No holes | No holes | 449 |
| Example 1 | 65 | 100 | 588 | 600 |
| Example 2 | 65 | 200 | 874 | 676 |
| Example 3 | 65 | 300 | 1101 | 715 |
| Example 4 | 65 | 400 | 1297 | 775 |
| Example 5 | 117 | 75 | 513 | 566 |
| Example 6 | 117 | 200 | 919 | 651 |
| Example 7 | 168 | 200 | 968 | 819 |
| Example 8 | 220 | 19 | 224 | 444 |

Figure 7:
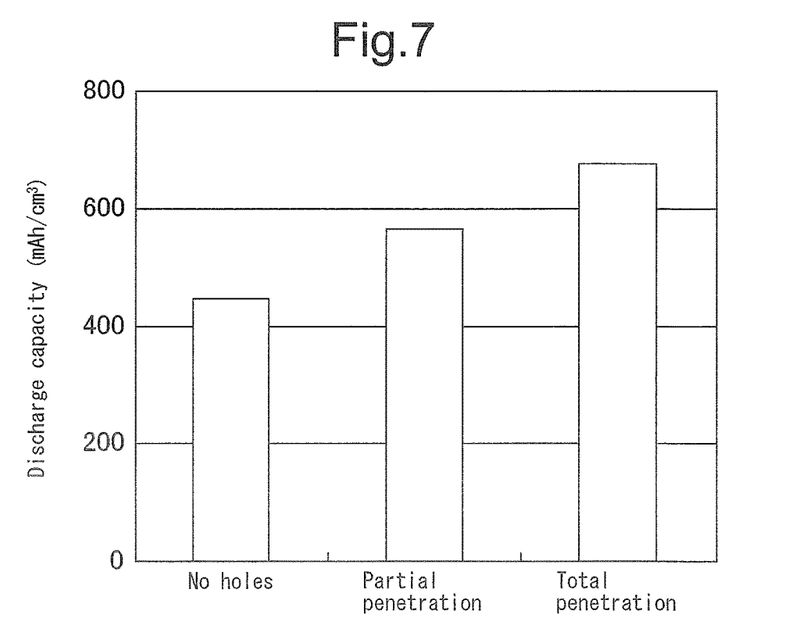
FIG. 7 is a graph showing values for the discharge capacity of a cell having through-holes or non-through-holes.

Table 4 and FIG. 7 show the values for discharge capacities of the cells fabricated in Comparative Example 1, Reference Example 1 and Example 2. The through-holes and non-through-holes had diameters of 65 the number of holes was 200, respectively, and the penetrating depth of the non-through-holes was 65 μm. The cell having non-through-holes formed partially penetrating through the positive electrode layer had relatively higher discharge capacity than the cell without through-holes, and the cell with through-holes formed had even higher discharge capacity.

TABLE 4

|  |  | Discharge capacity (mAh/cm³) |
| --- | --- | --- |
| Comparative Ex 1 | No holes | 449 |
| Reference Ex. 1 | Partial penetration | 566 |
| Example 2 | Total penetration | 676 |

EXPLANATION OF SYMBOLS

1 Positive electrode layer
2 Electrolyte layer

3 Negative electrode layer
6 Positive electrode collector
7 Negative electrode collector
8 Gas reservoir
9 Sealed container
10 Electrochemical cell

What is claimed is:

1. A metal-air battery comprising a positive electrode layer, a negative electrode layer and an electrolyte layer between the positive electrode layer and negative electrode layer,
 wherein the positive electrode layer comprises a carbon material and has two or more through-holes running through the thickness direction of the positive electrode layer,
 wherein the electrolyte layer comprises an aprotic organic solvent, an ionic liquid, or a combination thereof,
 wherein the through-holes are filled with the aprotic organic solvent, ionic liquid, or combination thereof, and
 wherein an inner wall area of the through-holes per unit volume of the positive electrode layer is in the range of 50 ($m^2/m^3$) to 5000 ($m^2/m^3$).

2. The metal-air battery according to claim 1, wherein the inner wall area of the through-holes per unit volume of the positive electrode layer is 80 ($m^2/m^3$) to 5000 ($m^2/m^3$).

3. The metal-air battery according to claim 1, wherein the inverse of the spacing between through-holes, which is the inverse of the mean distance between the through-holes, is 220 (l/m) or greater.

4. The metal-air battery according to claim 1, wherein the inverse of the spacing between through-holes, which is the inverse of the mean distance between the through-holes, is 510 (l/m) or greater.

5. The metal-air battery according to claim 1, wherein the diameters of the through-holes are 1 μm to 220 μm.

6. The metal-air battery according to claim 1, wherein the diameters of the through-holes are 65 μm to 170 μm.

7. The metal-air battery according to claim 1, which is a lithium-air battery.

8. The metal-air battery according to claim 2, wherein the inverse of the spacing between through-holes, which is the inverse of the mean distance between the through-holes, is 220 (l/m) or greater.

9. The metal-air battery according to claim 8, wherein the diameters of the through-holes are 1 μm to 220 μm.

10. The metal-air battery according to claim 8, which is a lithium-air battery.

11. The metal-air battery according to claim 2, wherein the diameters of the through-holes are 1 μm to 220 μm.

12. The metal-air battery according to claim 11, which is a lithium-air battery.

13. The metal-air battery according to claim 3, wherein the diameters of the through-holes are 1 μm to 220 μm.

14. The metal-air battery according to claim 13, which is a lithium-air battery.

15. The metal-air battery according to claim 2, which is a lithium-air battery.

16. The metal-air battery according to claim 3, which is a lithium-air battery.

17. The metal-air battery according to claim 5, which is a lithium-air battery.

* * * * *